(12) United States Patent
Gonsalves

(10) Patent No.: US 9,116,600 B2
(45) Date of Patent: Aug. 25, 2015

(54) AUTOMATICALLY PERSONALIZING APPLICATION USER INTERFACE

(75) Inventor: Michael Gonsalves, Stoughton, MA (US)

(73) Assignee: SAP SE, Walldorf (DE)

( * ) Notice: Subject to any disclaimer, the term of this patent is extended or adjusted under 35 U.S.C. 154(b) by 652 days.

(21) Appl. No.: 12/972,070

(22) Filed: Dec. 17, 2010

(65) Prior Publication Data

US 2012/0159345 A1 Jun. 21, 2012

(51) Int. Cl.
*G06F 3/0482* (2013.01)
*G06F 17/30* (2006.01)

(52) U.S. Cl.
CPC ........ *G06F 3/0482* (2013.01); *G06F 17/30867* (2013.01); *G06F 2203/04803* (2013.01)

(58) Field of Classification Search
CPC .................................................... G06F 3/0482
USPC ........................................................ 715/745
See application file for complete search history.

(56) References Cited

U.S. PATENT DOCUMENTS

| | | | |
|---|---|---|---|
| 6,340,977 B1 * | 1/2002 | Lui et al. ........................ | 715/709 |
| 7,613,692 B2 * | 11/2009 | Hamilton et al. ...................... | 1/1 |
| 8,271,899 B1 * | 9/2012 | Blackburn et al. ............ | 715/789 |
| 8,704,643 B2 * | 4/2014 | Bates et al. ................. | 340/12.22 |
| 2003/0066048 A1 | 4/2003 | Kumhyr et al. | |
| 2004/0088208 A1 | 5/2004 | Runge et al. | |
| 2004/0104913 A1 | 6/2004 | Walls et al. | |
| 2005/0005007 A1 | 1/2005 | Keohane et al. | |
| 2005/0120313 A1 * | 6/2005 | Rudd et al. ..................... | 715/866 |
| 2005/0132346 A1 | 6/2005 | Tsantilis | |
| 2006/0048060 A1 * | 3/2006 | Mohr et al. ..................... | 715/747 |
| 2006/0106755 A1 | 5/2006 | Stuhec | |
| 2006/0107219 A1 * | 5/2006 | Ahya et al. ..................... | 715/745 |
| 2007/0063998 A1 * | 3/2007 | Mahesh ......................... | 345/419 |
| 2007/0149036 A1 | 6/2007 | Misovski | |
| 2007/0150805 A1 | 6/2007 | Misovski | |
| 2007/0198291 A1 | 8/2007 | Pfeiffer et al. | |
| 2007/0220035 A1 | 9/2007 | Misovski | |
| 2007/0265779 A1 | 11/2007 | Misovski | |
| 2007/0300185 A1 | 12/2007 | Macbeth et al. | |
| 2008/0098085 A1 | 4/2008 | Krane et al. | |
| 2008/0163078 A1 * | 7/2008 | Van Der Sanden et al. .. | 715/762 |

(Continued)

OTHER PUBLICATIONS

UITS, "Knowledge Base," Sep. 10, 2009, Available http://web.archive.org/web/20090910041712/http://kb.iu.edu/data/ajww.html.*

(Continued)

*Primary Examiner* — Alvin Tan
(74) *Attorney, Agent, or Firm* — Fish & Richardson P.C.

(57) ABSTRACT

A computer-implemented method for automatically personalizing applications includes: receiving, in a computer system, user behavior data for multiple users of at least one application program, the application program having a user interface with multiple input controls displayed on multiple different panes, and the user behavior data reflecting actions performed using the input controls on the panes; identifying, using the computer system, at least one usage pattern in the user behavior data as meeting a usage pattern criterion; storing a personalization record based on identifying the usage pattern, the personalization record specifying the usage pattern as a sequence of activating at least some of the input controls on at least some of the panes; and automatically generating, using the computer system and based on the personalization record, a modified user interface according to the identified usage pattern.

18 Claims, 13 Drawing Sheets

(56) References Cited

U.S. PATENT DOCUMENTS

| | | |
|---|---|---|
| 2008/0178092 A1 | 7/2008 | Schmidt et al. |
| 2009/0300528 A1 | 12/2009 | Stambaugh |
| 2010/0058159 A1 | 3/2010 | May |

OTHER PUBLICATIONS

'Office Assistant' [online] Wikipedia, 2007 [retrieved on Nov. 30, 2010]. Retrieved from the Internet: <URL: http://web.archive.org/web/20071124114052/http:/en.wikipedia.org/wiki/Clippit>, 6 pages.

'Office 2003 Application Development All-in-One Desk Reference for Dummies' [online]. Mansfield, 2004 [retrieved on Nov. 29, 2010]. Retrieved from the Internet: <URL: http://www.worldcat.org/wcpa/servlet/DCARead?standardNo=0764570676&standardNoType=1&excerpt=true>, 7 pages.

'Knowledge Base' [online] Indiana University, 2005-2010 [retrieved on Nov. 30, 2010]. Retrieved from the Internet: <URL: http://kb.iu.edu/data/ajww.html>, 2 pages.

\* cited by examiner

FIG. 1A (Prior Art)

| Editing: RFx RFP-00001-BGNXM-2010: Monthly Office Supply Sourcing | | |
|---|---|---|
| ✓ Done  💾 Save  💾 Save and New  ✗ Cancel  ↶ Undo  Document▾  Actions▾  Reports▾ | | *110* |
| 📎 Attachments  💬 Discussions  💬 Chat  ➡ Created  ⭐ Favorites | | |

| Header | Exchange Rates | Schedule | Suppliers | Information | Specs | Questions | Line Items | Accounting |

*114A*

| Field | Value | |
|---|---|---|
| Current Phase: | Created | *114*  *112* |
| ID: | RFP-0001-bgnxm-2010 | |
| * Title: | Monthly Office Supply Sourcing | *116A* |
| Description: | [empty] | *116B* |
| | 0 of 256 characters | |
| Document Type: | RFP | |
| Company: | Biogenyx Medical | |
| Organizational Unit: | [empty] | *116C* |
| Location: | Boston Office | *116D* |
| * Product Category: | Office Supplies | *116E*  *116* |
| External Category: | [empty] | *116F* |
| Currency: | USD | |
| Estimated Value: | [empty] USD | *116G* |
| Budgeted Value: | 2,500.0000 USD | *116H* |
| | ☑ Enable Multiple Rounds | |
| Round Name: | None | *116I* |
| * Default Rank For RFx Responses: | Total Cost | *116J* |

General Status

| | | |
|---|---|---|
| Total number of Line Items: | 4 | *118* |
| Total Number of Questions: | 14 | |

Collaborators

| 📇 Add Users  📇 Add Groups  📇 Add Company  🗑 Delete Selected | | | | | | *120* |
|---|---|---|---|---|---|---|
| ☐ | Name | Type | E-mail | Role | Representative | Authorization |
| ☐ ✏ 🗑 | Mike Gonsalves | User | | Owner | Purchasing | readWrite |

Document Links

| 📇 Add  🗑 Delete Selected | | | *122* |
|---|---|---|---|
| Name | Title | Relationship | |

Change History

| | | *124* |
|---|---|---|
| Created By: | Mike Gonsalves 12/1/10 3:51 PM (EST) | |
| Last Changed By: | Mike Gonsalves 12/2/11 32 AM (EST) | |

FIG. 1B (Prior Art)   *100*

*Editing: RFx RFP-00001-BGNXM-2010: Monthly Office Supply Sourcing*

✓ Done | 🖫 Save | 🖫 Save and New | ✗ Cancel | ↶ Undo | Document▾ | Actions▾ | Reports▾ | 📎 Attachments | ◯ Discussions | ◯ Chat | ↑ Created | ☆ Favorites  _110_

| Header | Exchange Rates | Schedule | Suppliers | Information | Specs | Questions | Line Items | Accounting |

Invited Suppliers  _136_

🗋 Add  🗑 Delete Selected  Assign Line Item Visibility

| ☐ | Supplier ID | Supplier Name | Supplier Contact | E-Mail | Status | Event Multiplier | Event Additive Value 1 | Event Additive Value 2 |
|---|---|---|---|---|---|---|---|---|
| ☐ 🖉🗑 | VEN-000003 | Office Depot | Denny Daniels | | Initial | [ ] % | [ ] USD | [ ] USD |
| ☐ 🖉🗑 | VEN-000001 | Office Max | Max Maximillian | | Initial | [ ] % | [ ] USD | [ ] USD |
| ☐ 🖉🗑 | VEN-000004 | Staples | Susan Santos | | Initial | [ ] % | [ ] USD | [ ] USD |
| ☐ 🖉🗑 | VEN-000002 | WB Mason | Madison Mason | | Initial | [ ] % | [ ] USD | [ ] USD |

_114C_   _114D_   _114E_   _114_   _138_

Instructions: Set the following disclosure rules to determine how much competitive information is shared with suppliers Rank: ◯ Do not disclose rank
◯ By quartile
◯ Do not show total number participating
◯ Show total number participating Supplier Invitation Attachment: [ 📎 ]  _142_

Event Terms

🗋 Add  📥 Import from Library  🗑 Delete Selected

| Display Name | Terms Text |
|---|---|
|  |  |

Editing: Questions Section : RFP Questions

✓ Done · 💾 Save · 💾 Save and New · ✗ Cancel · ↺ Undo · 1 RFP Questions▲ · Next ⊙ · Actions▲ ⌒ *150*  *110*

| Question Summary | Section Info | Preview | Preferences |

\* Question Section Name: [RFP Questions]
\* Status: [Ready for Release ▼]   *146*

Questions

[Summary View ▼]   *148*

[Free Text ▼]   ≣ Add   ≣ Import from Library   🗑 Delete Selected   Add Group   ⟲ Reorder List

| ☐ | # | Question | Type | Contributes to Total Cost | Contributes to Total Price | Response Required |
|---|---|---|---|---|---|---|
| ▼✎🗑 | 1.1 General Questions | | | | | |
| ☐✎🗑 | 1.1.1 | Is this a Minority-Owned Business? | Yes or No Question | ☐ | ☐ | ☑ |
| ☐✎🗑 | 1.1.2 | Is this a Woman-Owned Business? | Yes or No Question | ☐ | ☐ | ☑ |
| ☐✎🗑 | 1.1.3 | In which year were you founded? | Number | ☐ | ☐ | ☑ |
| ☐✎🗑 | 1.1.4 | Do you have an E-Commerce Site? | Yes or No Question | ☐ | ☐ | ☐ |
| ☐✎🗑 | 1.1.5 | How many B&M Stores do you have? | Number | ☐ | ☐ | ☐ |
| ☐✎🗑 | 1.1.6 | In which of these states do you have stores? | Multiple Choice | ☐ | ☐ | ☐ |
| ▼✎🗑 | 1.2 Discounts | | | | | |
| ☐✎🗑 | 1.2.1 | Do you offer discounts for volume sales? | Yes or No Question | ☐ | ☐ | ☑ |
| ☐✎🗑 | 1.2.2 | Do you offer discounts for repeat customers? | Yes or No Question | ☐ | ☐ | ☑ |
| ▼✎🗑 | 1.3 Taxes | | | | | |
| ☐✎🗑 | 1.3.1 | Do you collect sales tax for internet sales? | Yes or No Question | ☐ | ☐ | ☑ |
| ▼✎🗑 | 1.4 Shipping | | | | | |
| ☐✎🗑 | 1.4.1 | Do you offer free shipping? | Yes or No Question | ☐ | ☐ | ☑ |
| ☐✎🗑 | 1.4.2 | Do you offer free return shipping? | Yes or No Question | ☐ | ☐ | ☑ |
| ▼✎🗑 | 1.5 Returns | | | | | |
| ☐✎🗑 | 1.5.1 | Do you charge a restocking fee for ret. items? | Yes or No Question | | ☐ | ☑ |
| ▼✎🗑 | 1.6 Customer Support | | | | | |
| ☐✎🗑 | 1.6.1 | Please describe your customer support options | Free Text | ☐ | ☐ | ☑ |
| ☐✎🗑 | 1.6.2 | What are the hours of operation for customer support? | Free Text | ☐ | ☐ | ☑ |

FIG. 1E (Prior Art)

*100*

*Editing: RFx RFP-00001-BGNXM-2010: Monthly Office Supply Sourcing*

✓ Done 📁 Save 📄 Save and New ✗ Cancel ⤺ Undo Document▼ Actions▼ Reports▼ 📎Attachments ⚟Discussions ⚟Chat ⬆Created ⭐Favorites — 110

| Header | Exchange Rates | Schedule | Suppliers | Information | Line Items | Accounting | — 114 |

Line Items — 152

Basic View ▼
📄 Add 📎 Add Materials 🗑 Delete Selected  Add BOM  Import Line Items  Export Line Items  Line Item Setup  Add Group  📋 Reorder List Group By: Show All ▼ — 154

| ☐ | ID | Line Item Type | Product ID | Description | Quantity | Allow Partial Qty Bids | Delivery Date | Product Category | Location | Plant | Price Required |
|---|---|---|---|---|---|---|---|---|---|---|---|
| ▼🗑 | | 1. Standard Supplies | | | — 154A    154C | | | | | | |
| ✏☐ | 1  1.1 | Material | A11 Lab Notebook | All Lab Notebook | 200 EA ▼ | ☐ | 1/1/11 | Office Supplies | Boston Office | ☐ | ○ |
| ✏☐ | 2  1.2 | Material | Number 2 Pencil | Number 2 Pencil | 300 EA ▼ | ☐ | 1/1/11 | Office Supplies | Boston Office | ☐ | ○ |
| ✏☐ | 3  1.3 | Material | Sharpie | Sharpie | 100 EA ▼ | ☐ | 1/1/11 — 154B | Office Supplies | Boston Office | ☐ | ○ |
| ✏☐ | 4  1.4 | Material | V7 Precision Pen | V7 Precision Pen | 500 EA ▼ | ☐ | 1/1/11 | Office Supplies | Boston Office | ☐ | ○ |

| | | | | | | | |
|---|---|---|---|---|---|---|---|
| | | Welcome M. Gonsalves | | My Settings | Help About Setup Reference | | Log Off |
| Quick Create▼ | Recent Items▼ | Favorites▼ | | | Search [    ] | In [  ]▼ Go | Advanced |

| Project Management | Enterprise Sourcing | Contract Management | Supplier Management | Express | Reports |
|---|---|---|---|---|---|

RFx > Monthly Office Supply Sourcing

*Editing: RFx RFP-00001-BGNXM-2010: Monthly Office Supply Sourcing*

✓ Done  💾 Save  💾 Save and New  ✗ Cancel  ↻ Undo  Document▲ Actions▲ Reports▲   110

📎 Attachments  💬 Discussions  💬 Chat  ➡️ Created  ⭐ Favorites  (REVIEW) ⌐ *204*

| Header | Questions | Line Items |
|---|---|---|

```
        ⌐114A ⌐114C  ⌐114E
             ⌐202                    * Title: [ Monthly Office Supply Sourcing ]  ⌐116A
                              Document Type:  RFP
                                   Location: [ Boston Office              ▢ ] ⌐116D
                          * Product Category: [ Office Supplies            ▢ ]
                                                                              ⌐116E
                             Budgeted Value: [              2,500.00 ] USD ⌐
                                                                              ⌐116H
                 * Default Rank for RFx Responses: [ Total Cost           ▼ ]
Schedule                                                                      ⌐116J
```

|  |  |  |  |  |
|---|---|---|---|---|
|  | RFx Response Due Date: | 12/31/10 📅 | 6:00 | pm ▼ ⌐ *132D* |

Suppliers

| ☐ | Supplier ID | Supplier Name | Supplier Contact | E-Mail | Status | |
|---|---|---|---|---|---|---|
| 📧 Add  🗑 Delete Selected  Assign Line Item Visibility | | | | | | |
| ☐ ✏️🗑 | VEN-000003 | Office Depot | Denny Daniels | | Initial | |
| ☐ ✏️🗑 | VEN-000001 | Office Max | Max Maximillian | | Initial | ⎫ |
| ☐ ✏️🗑 | VEN-000004 | Staples | Susan Santos | | Initial | ⎬ *138* |
| ☐ ✏️🗑 | VEN-000002 | WB Mason | Madison Mason | | Initial | ⎭ |

Collaborators

|   |  | Name | Type | E-mail | Role | Representative | Authorization | 120 |
|---|---|---|---|---|---|---|---|---|
| 📧 Add Users  📧 Add Groups  📧 Add Company  🗑 Delete Selected | | | | | | | | |
| ☐ | ✏️ 🗑 | Mike Gonsalves | User | | Owner | Purchasing | readWrite | |

Change History

|  |  | 124 |
|---|---|---|
| Created By: | Mike Gonsalves 12/1/10 3:51 PM (EST) | |
| Last Changed By: | Mike Gonsalves 12/2/11 1:32 AM (EST) | |

FIG. 2   ⌐*200*

New Sourcing Event (RFP)

Next ⊙  ✗ Cancel  — 302  204 — REVIEW

Job Description

Enter summary information describing your job or project. Fields marked * are required.

* Title: [Monthly Office Supply Sourcing] — 304
* Quote Due Date: [12/31/10] [6:00] [pm ▼]  ⎫
  Budgeted Value: [2500] [USD ▼]  ⎬ 306
  — 116A, 132D, 116H

Line Items

Enter a brief description for each line item, e.g., pieces of services, which are part of your request. At least one line item is required.  — 308

Description — 310

1  [A11 Lab Notebook]

2  [Number 2 Pencil]

3  [Sharpie]

4  [V7 Precision Pen]

*Enter Specification for Item 1*

◉ Back  Next ◉   ✗ Cancel                                204 ⌢ REVIEW

⌒
302

Description
_____

* Item Description:  | A11 Lab Notebook |  ⌐ 154A

* Delivery Date:     | 1/11/10 | | 6:00 | | pm ▶ |  ⌐ 154B

* Quantity:          | 200 | | EA ▶ |  ⌐ 154C

Submit 302

◉ Back ✓ Submit ✗ Cancel  204 ⌐ REVIEW

Confirm that the request information is correct. If you are done, click the Submit button. If you do not want to submit this request for processing, click the Cancel button. To change Job Description or any other information, use the Back button on the top of the page.

Description  314

\* Title   Monthly Office Supply Sourcing  316
\* Quote Due Date:  12/31/10 6:00 PM (EST)
Budgeted Value:  2,500.00 USD

Line Items

To change a line item, click the line item description. To delete a line item, click the delete icon.  308

| | Description | Quantity | |
|---|---|---|---|
| 1 | A11 Lab Notebook | 200EA | 🗑 |
| 2 | Number 2 Pencil | 300EA | 🗑 |
| 3 | Sharpie | 200EA | 🗑 |
| 4 | V7 Precision Pen | 500EA | 🗑 |

Suppliers  318

| | Supplier | Contact | E-Mail |
|---|---|---|---|
| ☐ | Office Depot | Denny Daniels | |
| ☐ | Office Max | Max Maximillian | |
| ☐ | Staples | Susan Santos | |
| ☐ | WB Mason | Madison Mason | |

| | User₁ | | User₂ | | User₃ | | ... | Userᵧ | |
|---|---|---|---|---|---|---|---|---|---|
| Aspect₁ | 28ᵗʰ | 3 s. | 1ˢᵗ | 2 mins. | --- | --- | | 1ˢᵗ | 15 s. |
| Aspect₂ | 11ᵗʰ | 7 mins. | 38ᵗʰ | 15 s. | 17ᵗʰ | 5 min. | | 2ⁿᵈ | 2 mins. |
| Aspect₃ | Mth | 1 min. | 9ᵗʰ | 8 mins. | 3ʳᵈ | 48 s. | | 39ᵗʰ | 8 mins. |
| Aspect₄ | --- | --- | --- | --- | --- | --- | | --- | --- |
| ... | | | | | | | | | |
| Aspectₘ | 2ⁿᵈ | 28 s. | 41ˢᵗ | 18 s. | 21ˢᵗ | 8 min. | | 14ᵗʰ | 29 s. |
| Total | | 22 mins. | | 19 mins. | | 12 mins. | | | 31 mins. |

FIG. 5

AUTOMATICALLY PERSONALIZING APPLICATION USER INTERFACE

TECHNICAL FIELD

This document relates to automatically personalizing an application user interface.

BACKGROUND

Business applications, such as those used in the field of enterprise resource planning (ERP), are becoming more and more sophisticated and rich with features. As the functional scope of these applications broadens, sometimes their complexity increases and non-intuitive user interactions are added. Customers, in turn, spend a considerable amount of time customizing the application and modeling their business processes. Moreover, end users further personalize their view into the application to better suit their needs and daily usage habits. Personalization is sometimes correlated with user productivity. In some existing systems, parts of an application that a particular user does not need can be hidden, frequently used report fields that are typically not shown by default can be added, user interface (UI) elements can be reordered, to name some examples. However, such personalization can also be a time consuming process and the end result may still not yet be truly optimal.

As an illustration, consider an existing business process for sourcing materials to a large organization. FIGS. 1A-F show a prior art UI 100 for an application program. Such an application can host strategic sourcing projects for buyers across multiple independent enterprises. In this example, a buyer performs a recurring project to source office supplies at the end of each month. The project serves to create a corresponding business document, such as a request for proposal (RFP), a request for information (RFI), or a request for quote (RFQ). In each case, the user follows a similar workflow while the project is executed, navigating back and forth through various screens for the project. Assume that the user is here creating an RFP.

With reference now to F1A, the UI 100 is here configured for gathering delivery information for the RFP. That is, the UI 100 includes tabs 102 for various aspects of the project, and currently the user has selected a tab 102A for "Delivery Info". The tab 102A generates a pane 104 where the user enters delivery information. Particularly, the pane 104 includes input controls 106 where the user specifies information regarding Inco Terms for the RFP. Also, an input control 108 lets the user specify a delivery schedule for the RFP. When done with the pane 104, the user can click "Done" in a toolbar 110.

With reference now also to FIG. 1B, the UI 100 provides a pane 112 that requests more specific information about the RFP. The pane 112 corresponds to a particular selection that the user makes among tabs 114. Here, the user has selected a tab 114A for "Header". The pane 112 includes multiple input controls 116 which will now be described.

An input control 116A provides that the user can enter a title for the RFP. Currently, the user has typed "Monthly Office Supply Sourcing." An input control 116B provides that the user can enter a further description for the RFP. Here, the user has not added any description in the control 116B. An input control 116C provides that the user can specify an organizational unit for the RFP. Here, the user has not specified any organizational unit in the control 116C. An input control 116D provides that the user can specify a location for the RFP. Currently, the user has entered "Boston Office" in the control 116D. An input control 116E provides that the user can specify a product category for the RFP. Currently, the user has specified "Office supplies" in the control 116E. An input control 116F provides that the user can specify an external category for the RFP. Here, the user has not specified any external category in the control 116F. An input control 116G provides that the user can specify an estimated value for the RFP. Here, the user has not specified any estimated value in the control 116G. An input control 116H provides that the user can specify a budgeted value for the RFP. Currently, the user has entered $2,500,000 in the input control 116H. An input control 116I provides that the user can specify a round name for the RFP. Here, the user has not specified any round name in the control 116I. An input control 116J provides that the user can specify a default rank for responses to the RFP. Here, the user has specified "Total Cost" as the default rank in the input control 116J.

An area 118 in the pane 112 specifies the general status for the RFP.

An area 120 in the pane 112 specifies one or more collaborators that have been tied to the RFP being created.

An area 122 in the pane 112 provides that the user can add one or more document links to the RFP.

An area 124 of the pane 112 shows a change history for the RFP.

After working with the pane 112, the user can choose another one of the tabs 114 or close the RFP using the toolbar 110.

With reference now also to FIG. 1C, the UI 100 here shows a pane 126 that is presented when the user chooses a tab 114B called "Schedule". The pane 126 here includes input controls 128 for specifying one or more phases for the RFP.

An area 130 of the pane 126 includes input controls 132 relating to standard dates. An input control 132A provides that the user can specify a planned open date for the RFP, and an input control 132B provides that the user can specify that a phase change should automatically take place on the planned open date. Here, the user has not made any entries in the controls 132A-B. An input control 132C provides that the user can specify an intention-to-respond date for the RFP. Here, the user has not entered any date in the control 132C. An input control 132D provides that the user can specify a response due date for the RFP. Currently, the user has entered Dec. 31, 2010, at 6.00 P.M. in the control 132D. Input controls 132E provide that the user can choose to activate or deactivate various options for the RFP. Here, the user has not made any selections in the controls 132E. An input control 132F provides that the user can specify a date when a notice for the RFP is to be published, and a control 132G allows the user to publish the notice to all suppliers. Here, the user has not made any entries in the controls 132F-G. An input control 132H provides that the user can specify a base date for the RFP. Here, the user has entered Dec. 1, 2010, in the control 132H.

The pane 126 includes an area 134 where the user can maintain or modify schedule items for the RFP.

After working with the pane 126, the user can choose another one of the tabs 114 or close the RFP using the toolbar 110.

With reference now also to FIG. 1D, the UI 100 here shows a pane 136 that is presented when the user chooses a tab 114C called "Suppliers". The pane 136 here includes input controls 138 for specifying one or more invited suppliers for the RFP. Here, the user has entered four invited suppliers.

The pane 136 also includes an input control 140 for setting disclosure rules for the RFP with regard to the invited supplier(s), and an input control 142 for attaching one or more documents to the supplier invitation(s).

Finally, the pane 136 here includes an area 144 where the user can specify one or more event terms for the RFP. Currently, the user has not specified any event terms in the area 144.

After working with the pane 126, the user can choose another one of the tabs 114 or close the RFP using the toolbar 110.

For example, if the user selects a tab 114D called "Questions," a display such as that of FIG. 1E can be presented. With reference now also to FIG. 1E, the UI 100 here shows a pane 146 that allows the user to change or choose one or more questions to be posed in the RFP. The pane 146 here includes input controls 148, each of which corresponds to a separate question.

After working with the pane 126, the user can choose another one of tabs 150 or close the RFP using the toolbar 110.

With reference again briefly to FIG. 1D, if the user selects a tab 114E called "Line Items," a display such as that of FIG. 1F can be presented. Here, a pane 152 includes input control 154 for changing or choosing one or more line items for the RFP. Currently, four line items are listed in the input control 154. Each line item is specified by multiple aspects, such as by a control 154A for a brief description, a control 154B for a delivery date, and a control 154C for quantity, to name a few examples.

After working with the pane 152, the user can choose another one of tabs 114 or close the RFP using the toolbar 110.

Thus, the above example illustrates a number of different panes and input controls that are available when creating a business document, for example an RFP. Also, in this example the user created the RFP without visiting some of the tabs 114, and without using some of the input controls on the respective panes.

SUMMARY

This document describes systems and techniques that leverage information that an application already knows, or has access to, in order to aid in producing a better user experience that allows users to more efficiently do their job. For example, a user interface can automatically be personalized. As another example, inferred best practices can automatically be implemented or suggested to a user. Any or all of these can be performed on-the-fly at runtime, without modifying the application code.

In some implementations, usage information is gathered by tracking user behavior data in the system having the application(s) implemented. By routing this same usage information back into a development organization, the usability of the application can be further improved by revealing real-world issues and inefficiencies to the application's product team.

In a first aspect, a computer-implemented method for automatically personalizing applications includes: receiving, in a computer system, user behavior data for multiple users of at least one application program, the application program having a user interface with multiple input controls displayed on multiple different panes, and the user behavior data reflecting actions performed using the input controls on the panes; identifying, using the computer system, at least one usage pattern in the user behavior data as meeting a usage pattern criterion; storing a personalization record based on identifying the usage pattern, the personalization record specifying the usage pattern as a sequence of activating at least some of the input controls on at least some of the panes; and automatically generating, using the computer system and based on the personalization record, a modified user interface according to the identified usage pattern.

In a second aspect, a computer program product tangibly embodied in a computer-readable storage medium includes instructions that when executed by a processor perform a method for personalizing applications. The method includes: receiving, in a computer system, user behavior data for multiple users of at least one application program, the application program having a user interface with multiple input controls displayed on multiple different panes, and the user behavior data reflecting actions performed using the input controls on the panes; identifying, using the computer system, at least one usage pattern in the user behavior data as meeting a usage pattern criterion; storing a personalization record based on identifying the usage pattern, the personalization record specifying the usage pattern as a sequence of activating at least some of the input controls on at least some of the panes; and generating, using the computer system and based on the personalization record, a modified user interface according to the identified usage pattern.

In a third aspect, a computer system includes: a processor; a display device; and a computer readable storage device having stored therein: at least one application program having a user interface with multiple input controls displayed on multiple different panes; user behavior data for multiple users of the application program, the user behavior data reflecting actions performed using the input controls on the panes; and instructions that when executed by the processor generate an analyzer module that identifies at least one usage pattern in the user behavior data as meeting a usage pattern criterion, and stores a personalization record based on identifying the usage pattern, the personalization record specifying the usage pattern as a sequence of activating at least some of the input controls on at least some of the panes; wherein the computer system generates, based on the personalization record, a modified user interface for the application program according to the identified usage pattern.

Implementations can include any or all of the following features. Generating the modified user interface comprises hiding at least one of the input controls or panes. Generating the modified user interface further comprises generating a guided visual procedure for the application program, the guided visual procedure generated based on the personalization record. The modified user interface includes a control for viewing the user interface. The usage pattern criterion requires that a majority of the multiple users employed the usage pattern. The usage pattern criterion requires that the usage pattern be faster performed than other usage patterns, or that the usage pattern involve fewer panel revisits than the other usage patterns. The method further includes automatically adding by the computer system information in at least one of the input controls, the information obtained from the identified usage pattern.

Implementations can provide any or all of the following advantages. A personalization process is automated by evaluating how users actually use one or more applications. The "wisdom of crowds" and the "network effect" are leveraged to automatically personalize an application and propose a best-practice usage pattern.

The details of one or more implementations are set forth in the accompanying drawings and the description below. Other features and advantages will be apparent from the description and drawings, and from the claims.

DESCRIPTION OF DRAWINGS

Figure 1A:
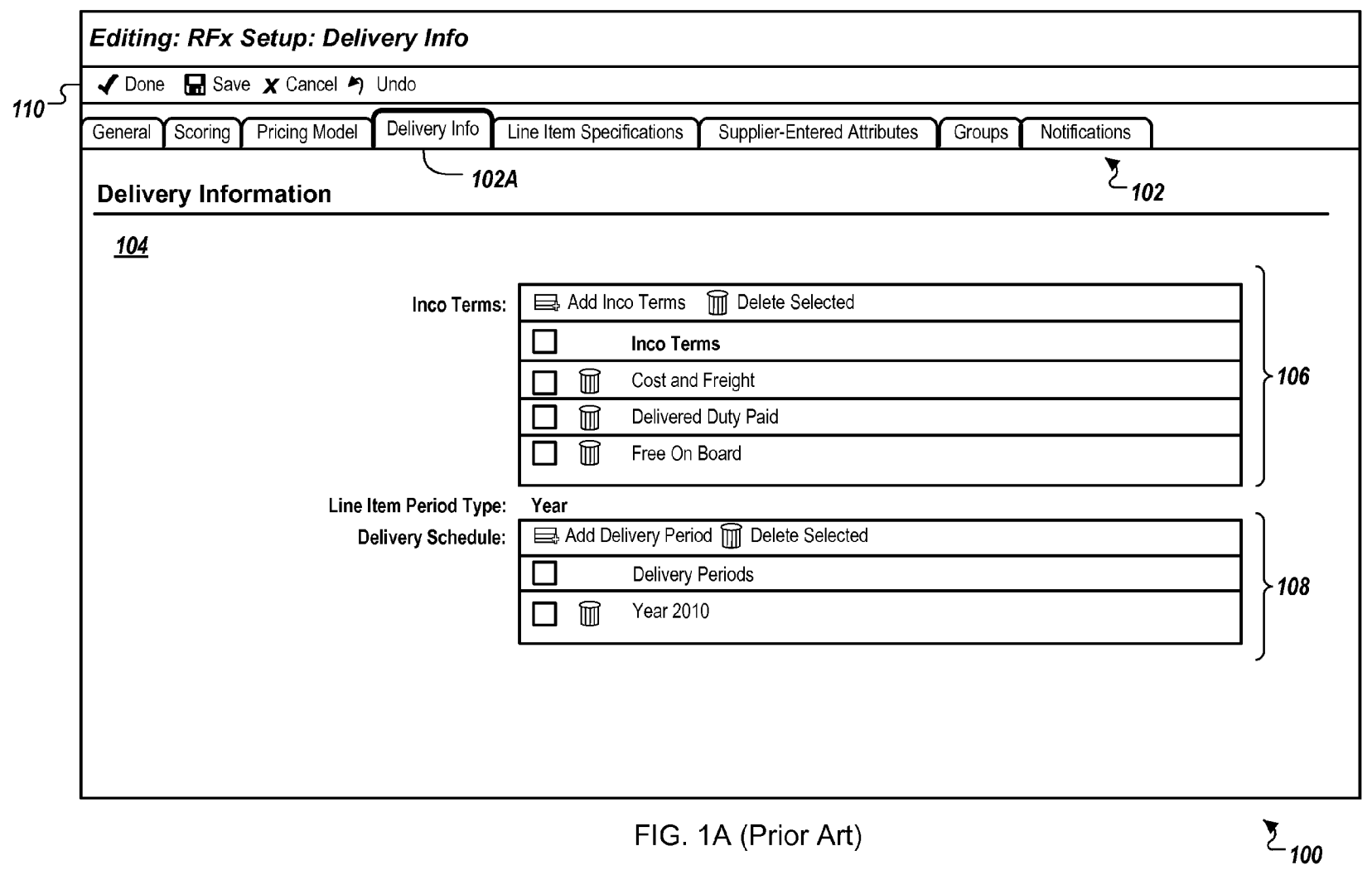

FIGS. 1A-F show a prior art user interface for an application program.

FIG. 2 shows an example of a personalized user interface for the application program.

FIGS. 3A-C show examples of a personalized user interface with a guided visual procedure.

FIG. 5 shows an example of user behavior data.

Like reference symbols in the various drawings indicate like elements.

DETAILED DESCRIPTION

Figure 1C:
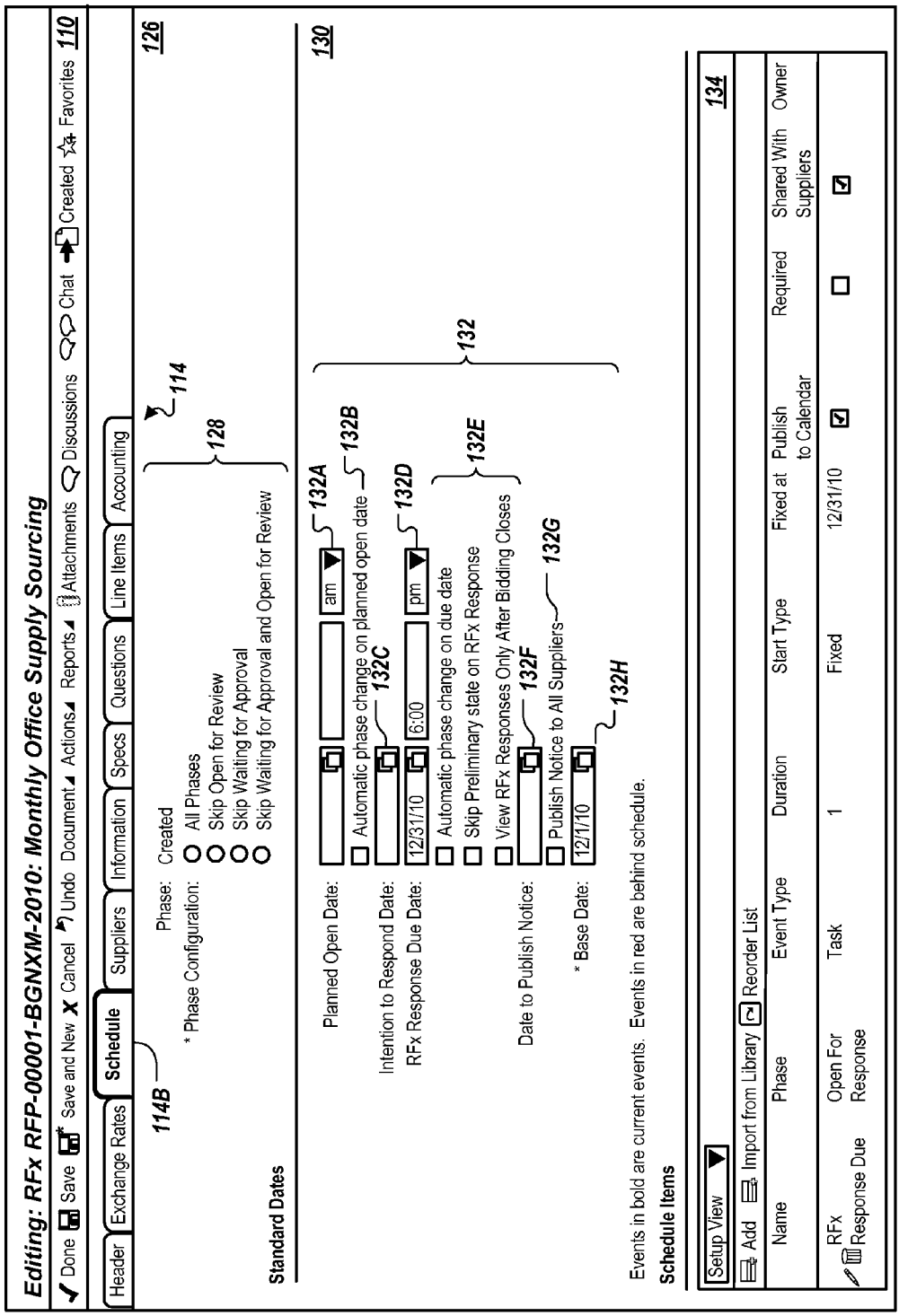

Implementations to be described in examples herein make use of knowledge about user behavior to simplify or enhance or otherwise improve an application interface for one or more users. The more users whose actions have been collected, and the broader the set of usage scenarios that are covered by the behavior tracking, the better the user experience can be personalized for any particular user. In an ERP system, for example, the backend application server knows about everything that is occurring in the application among multiple users at different locations. At any given time, the server knows how many users are on the system, where they are at in the application, how long they have been on the current screen, where they came from, which features they are using, what types of events they are creating, which fields they are using, and what types of errors they run into, to name just a few examples.

This substantial wealth of information is tapped into for one or more purposes. In some implementations, historical and current usage information is correlated across a large number of users. One result thereof is that one can begin to extrapolate optimal usage patterns and best practice event setups. For example, given a user who has a recurring sourcing project for office supplies, the system can keep metrics about how this user is interacting with the system and executing the event. After executing similar events up to the point where the system reaches a defined data collection threshold for the usage patterns, it will have enough information to optimize the application for this specific user whenever he or she creates sourcing events of this type. As another example, the system can reflow the UI to better group required fields together, to eliminate navigation steps, and/or to remove elements that were never used when any user sourced this category of goods.

Best practices scenarios can be created based on captured usage patterns and statistics for many users. If a sufficient number of users have sourced the same category of goods and there are enough commonalities in how they execute the project, a usage pattern can be identified and the system can automatically identify this as a best practice scenario for the sourcing process (the "best practice" for short). Thus, even if a current user has never created a sourcing project for a given category of item, the best practice can be offered as a support and guidance to the user. For example, in the procedure of creating the sourcing project, the user can be presented with the option of automatically using a best practice or starting from scratch.

In some implementations, the application can further take advantage of usage information to which the backend server already has access. For example, if users are spending a lot of time in one particular area of the application, this could be an indicator to the product team that that this area needs to be redesigned. As another example, if users always trigger errors in a particular area of the application, this can provide an opportunity to present personalized help content. This is also an example of a product team reusing usage information to further refine an application with the goal of eliminating the problem of adding new complexities with each release. Instead, this endeavor seeks to provide future releases that optimized, streamlined, and made leaner in accordance with how customers actually use the application.

The following example illustrates an improvement in the UI for the sourcing project that can be automatically created based on tracking user behavior regarding the application program. FIG. 2 shows an example of a personalized UI 200 for the application program. The UI 200 here includes tabs 202 that allow the user to choose between different panes. In some implementations, the tabs 202 are included in the UI 200 as a subset of the tabs 102 (FIGS. 1A-F). For example, the tabs 202 here include the tab 114A (currently selected), the tab 114C and the tab 114E.

The UI 200 here also includes some, but not all, of the input controls that were mentioned above for the UI 100 (FIGS. 1A-F). For example, the UI 200 includes the following: input controls 116A, 116D, 116E, 116H, 116J, 132D, and 138, and also the areas 120 and 124, each of which includes at least one input control.

After working in the tab 114A, the user can select any of the other tabs 202 (e.g., the tab 114C or 114E), or can close the RFP using the toolbar 110.

Accordingly, the UI 200 provides a simplified and streamlined UI for creating a source request, which UI was automatically created by analyzing one or more usage patterns of those who use the same application program.

The UI 200 can include a review control 204 which can be used to toggle between the UI 200 and the corresponding pane or panes in the UI 100 (FIGS. 1A-F). For example, upon reviewing the suppliers listed in the control 138 a user might think that it would be helpful to see the context where this information has been entered in the past. The user can therefore activate the button 204 to cause the system to change the user interface. In this example, the user may then be presented with the pane 136 (FIG. 1D). When the pane 136 or any other pane is presented as a result of the button 204, the pane may have a corresponding control (not shown) for toggling back to the UI 200 or any other personalized UI.

In some implementations, the modified UI includes a guided procedure that is designed based on one or more usage patterns. FIGS. 3A-C show examples of a personalized UI 300 with a guided visual procedure. The UI 300 includes a Back/Next control 302 by which the user can navigate to any and all panes in the UI 300. Currently, a pane 304 is presented in the UI 300. The pane 304 includes input controls 306 regarding the project; i.e., regarding the request document that is being created. Here, the input controls 306 include the controls 116A, 132D and 116H. For example, these controls have been assembled together based on a usage pattern identified in tracked user behavior data.

The UI 300 also includes an area 308 that in this example is related to content that was otherwise presented under the tab 114E (FIG. 1F). For example, the area 308 can include one or more input controls 310 for entering a brief description of a line item to be covered by the business document (e.g., by the RFP). Here, the user has specified four line items.

After entering each description, the user may be presented with a separate pane for the specifics of that line item. With reference now also to FIG. 3B, a pane 312 is presented. The pane 312 includes single instances of the input controls 154A (description), 154B (delivery date) and 154C (quantity). Accordingly, the user enters the corresponding information for the line item that is being specified. For example, the pane 312 and/or the guided procedure may have been created because user behavior data showed that users need a more logical UI for specifying line items. Also, the control 310 for specifying line items here appears early in the guided procedure (e.g., on the first screen). This contrasts with the pane 152 (FIG. 1F), which the user might have arrived at late in the process if the user proceeded through the corresponding tabs in order. Accordingly, the earlier placement of the input controls for line items can be a result of observing, in tracked usage patterns, that users prefer to specify the line item(s) early in the process.

When the user is done with the pane 312, the user can specify another line item in a similar way using the pane 312, or continue working in the pane 304.

FIG. 3C shows a pane 314 that summarizes the business document (e.g., the RFP) in its current state. In some implementations, the pane 314 includes an area 316 that contains description of the business document; the area 308 for the line items; and an area 318 that summarizes the listed supplier(s) for the business document.

The area 318 can be populated with information about suppliers in one or more different ways. For example, in the tracked usage data the system may have detected a consistent set of suppliers that were always selected with a high degree of probability for events of this category (e.g., RFPs). Therefore the system would automatically add those detected suppliers to the area 318, and not provide any selection screens in the guided procedure steps. Instead, the detected suppliers would be shown only on the final confirmation screen. On that screen (i.e., in the area 318), the user can add or remove suppliers, or the user can keep the system-recommended suppliers. This keeps the process and steps lean and efficient.

In some implementations, some or all of the information in the area 318 is explicitly entered by the user. For example, each of the suppliers listed in the area 318 may have been entered in an iterative procedure similar to that described above for the line items (FIGS. 3A-B). The system may have chosen to create the iterative procedure upon detecting enough variance in the set of suppliers when analyzing the tracked usage data.

Data that is never or only very rarely used can be hidden or omitted. For example, the input controls 138 (FIG. 2) included columns labeled "Supplier ID" and "Status," but these columns are not visible in the area 318.

Accordingly, the panes 304, 312 and 314 provide a guided procedure for creating a business document, and this procedure may correspond to a best practice that has been identified or otherwise established for such business document(s).

Figure 4:
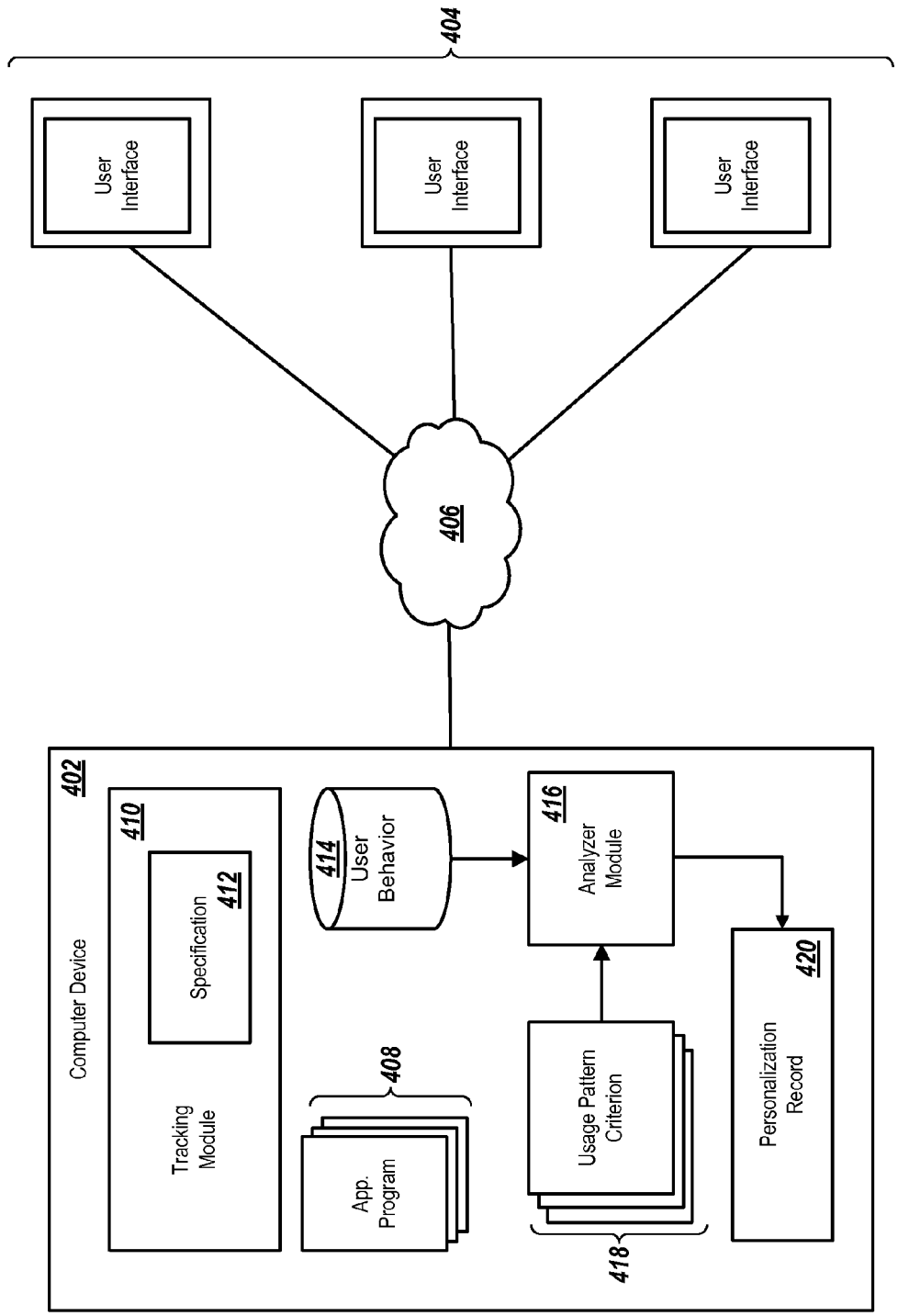
FIG. 4 shows an example of a system that can generate a personalized user interface for an application program.

FIG. 4 shows an example of a system 400 that can generate a personalized user interface for an application program. Here, the system 400 includes a computer device 402 that can communicate with any or all user devices 404 through any kind of network 406, such as a local computer network or the internet. The devices can include any processor-based technology. The computer device 402 can include an application server, and the user devices 404 can include personal computers, laptops, and/or mobile devices such as smartphones, to name just a few examples.

The computer device 402 has one or more application programs 408 installed thereon. In some implementations, one or more of the application programs 408 include an ERP application. For example, the application program 408 can be designed to generate business documents, such as the requests mentioned in examples above.

Users of the user devices 404 interact with the application program(s) in one or more ways, for example to perform ERP functions. The computer system 402 includes a tracking module 410 that documents or otherwise registers some or all of the users' actions. In some implementations, any or all actions that the UI 100 (FIG. 1A-F) is designed to support can be tracked. For example, the tracking module 410 can have at least one specification 412 that identifies one or more types of action that is to be tracked.

In some implementations, the tracking module 410 tracks whether the users add publicly available content to events. For example, if users choose suppliers from an available supplier repository, then the specification 412 can indicate that the set of suppliers that users choose from the repository should be tracked. One result of tracking such data is that event documents can be pre-populated with content. Such pre-population can be done in addition to, or instead of, reflowing and personalizing the user interface. In some implementations, the best practice is a combination of optimized user experience and proposed content. To ensure that information collection does not interfere with users' privacy rights or trade secrets, this tracking is either done only when the tracking is known to be allowed, or an opt-in mechanism is used for some types of data.

Thus, the tracking module 410 can monitor events in the application program(s) 408 and register user-specific actions that are named in the specification 412. The tracking module 410 can store or otherwise memorialize the tracked activities in a user behavior repository 414, such as a database or a storage facility.

The tracking module 410 can store the user behavior data in any suitable format, organization or structure. In some implementations, the user behavior data when captured contains the basic information about what user took what action, and when. Accordingly, the user behavior repository 414 can store raw tracking data organized by one or more of user identity, action name, and timestamp.

In some implementations, the user behavior data can be processed in one or more ways. The usage data for each user can be organized by the actions regardless of the order in which the user performed them, and/or the amount of time spent per action can be calculated. For example, the time that elapses from the moment the user performs one action until the next individually tracked action can be defined as the amount of time that the user spent on performing the latter action.

FIG. 5 shows an example of user behavior data 500. In this example, the user behavior data 500 is based on actions taken by N users of the same application program, here called $User_1$ through $User_N$, respectively. That is, these actions are tracked while the users are using an unmodified version of the UI, such as the UI 100 (FIGS. 1A-F). Moreover, the application program in this example has M aspects for which actions are tracked, here called $Aspect_1$ through $Aspect_M$, respectively. In some implementations, the M aspects are tracked because they are the ones listed in the specification 412 (FIG. 4). For example, any of the input controls described above can be one of the aspects.

For each user, the user behavior data 500 has a column 502 that specifies the order in which the user worked on each particular aspect is performing the procedure. That is, for $User_1$ the user behavior data 500 shows that the first listed aspect (i.e., $Aspect_1$) was the $28^{th}$ action detected for this user in the tracking, and the third aspect was the last (i.e., Mth) action detected. A column 504 specifies the time that the user spent on the particular aspect. For example, $User_2$ spent 8 minutes working on (and/or viewing) the $Aspect_3$.

The user behavior data 500 has a row 506 that shows the total cumulative time for each user. For example, the $User_2$ spent a total of 19 minutes in performing the tracked actions of the current application program.

Some tracked aspects were not used when the user behavior data 500 was collected. For example, none of the shown users (i.e., User₁, User₂, User₃ and User$_N$) used the fourth aspect. As another example, User₃ did not use the first aspect.

Other ways of organizing or processing the user behavior data can be used.

With reference now again to FIG. 4, the computer device 402 includes an analyzer module 416 that analyzes the user behavior data 414. In some implementations, the analyzer module 416 looks for one or more usage patterns in the user behavior data 414.

Any useful usage pattern can be detected. In some implementations, the order in which different users perform actions is taken into account. For example, if many users perform a certain action first, or otherwise early, in the process, this can be identified as a usage pattern. As another example, if many users omit a certain action in the process, this can be identified as another usage pattern. In some implementations, the time users spend on various aspects of the application program are taken into account. Usage patterns can be specified by one or more usage pattern criteria 418. That is, the analyzer module 416 can read or otherwise access at least one of the usage pattern criteria 418 and analyze the user behavior data 414 to see if it meets the criterion or criteria.

A usage pattern can be based on fewer than all of the tracked users. In some implementations, one or more thresholds (e.g., a majority rule) are defined for the criterion. For example, the threshold for omitting a UI aspect can be set relatively high, such as at 99% or above. That is, if it is detected that 99% or more of the users skip a particular aspect, only then is the criterion for a usage pattern satisfied so that the aspect will be removed (akin to how some input controls from FIGS. 1A-F were omitted in the UIs 200 and/or 300).

As another example, the threshold for rearranging a UI aspect can be set relatively lower that the omission criterion, such as at 45% or above. That is, if it is detected that 45% or more of the users perform a particular action first or early in the sequence, then the UI can automatically be modified to ensure that this aspect is visible to the user at the beginning of the process. For example, in the UI 200 (FIG. 2), note how the controls 138 were located on the "Header" pane; as another example, in the UI 300 (FIGS. 3A-C), note how the "line items" guided procedure was launched already from the first pane 304.

Other thresholds and/or criteria can be used. For example, it can be taken into account which user(s) finished the process (e.g., of creating a business document) the fastest. The order in which these users performed the actions can be defined as a best practice scenario. As another example, among the users who are the slowest to complete the process, one or more common characteristics can be identified, such as: "the user performed the action X only at the very end, which in turn made it necessary to perform multiple updates elsewhere."

Here, the analyzer module 416 generates one or more personalization record 420 based on the analysis. In some implementations, the personalization record 420 is created to reflect one or more usage patterns that have been identified in the user behavior data 414, and can contain specific executable instructions for modifying the UI. For example, the personalization record 420 can define a best pattern scenario for creating a business document. As another example, the personalization record 420 defines what input controls of the UI 100 (FIGS. 1A-F) that should be omitted when generating the UI 200 (FIG. 2) and/or the UI 300 (FIGS. 3A-C). The personalization record 420 can also include the code or other instructions for switching between the old and new UI, for example in response to the user activating the button 204 (FIGS. 2, 3).

Figure 6:
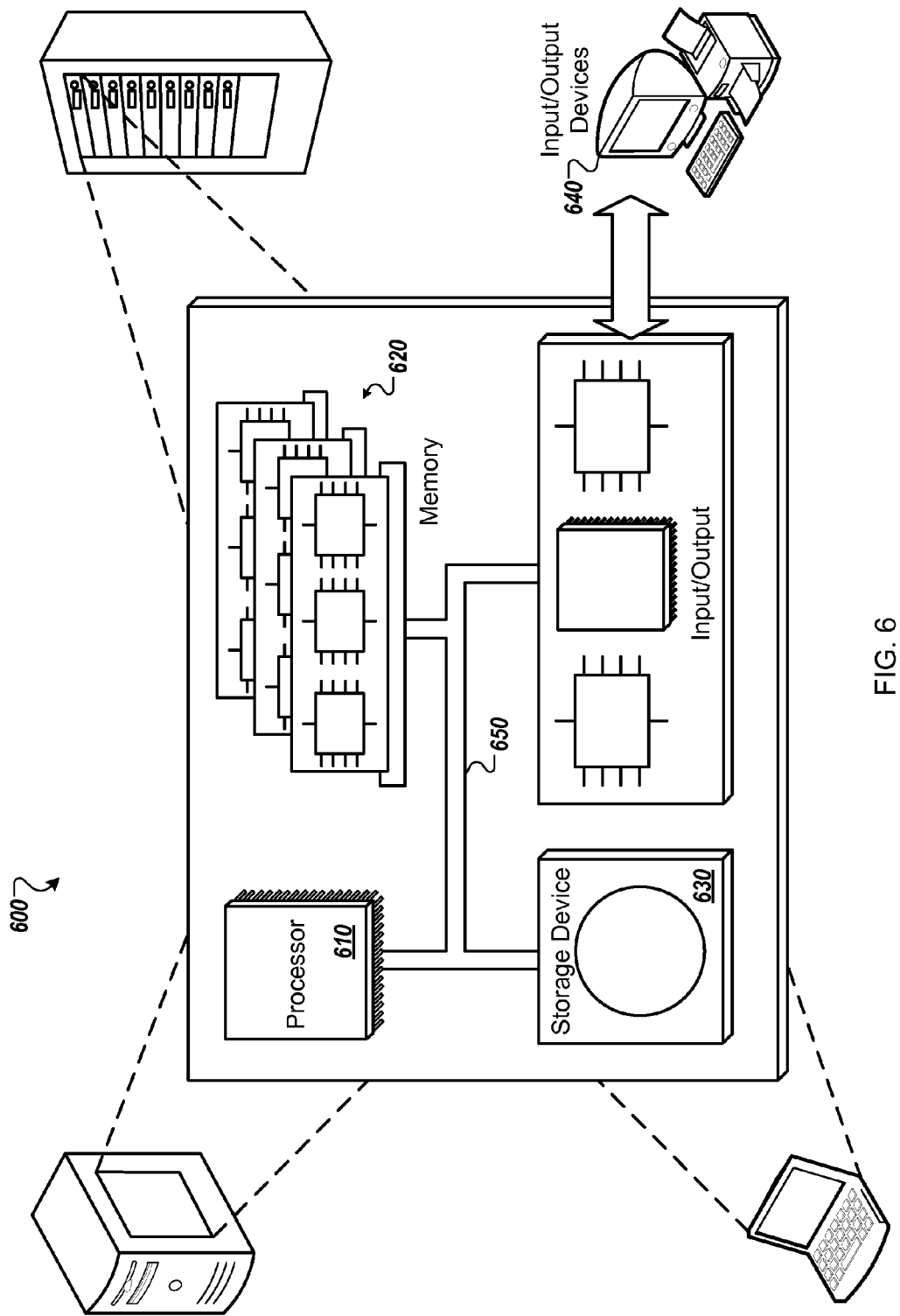
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. The memory 620 is a volatile memory unit in some implementations and is a non-volatile memory unit in other implementations.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for automatically personalizing applications, the method comprising:
   providing, by a computer system, a first page for display as part of a first user interface of a particular application program, wherein the first page includes:
      (i) multiple first input controls, including a first input control, with which users are able to interact in order to specify information for input to the computer system, and
      (ii) a first navigation control that, when selected, causes navigation to a second page of the particular application program;
   receiving, by the computer system, first data that indicates that a user selected one or more of the multiple first input controls wherein the first data indicates that the user selected the first input control;
   receiving, by the computer system, an indication that the user selected the first navigation control to navigate to the second page;
   providing, by the computing system and in response to having received the indication that the user selected the first navigation control, the second page for display as part of the first user interface, wherein the second page includes multiple second input controls, including a second input control, with which the user is able to interact in order to specific information for input to the computer system;
   receiving, by the computer system, second data that indicates that the user selected one or more of the multiple second input controls wherein the second data indicates that the user selected the second input control;
   analyzing, by the computer system, the received first data and the received second data in order to identify a particular sequence of interactions with at least the first input control and the second input control;
   storing, by the computer system, information that specifies the particular sequence of interactions with at least the first input control and the second input control;
   automatically generating, by the computer system and based on an analysis of the information that specifies the particular sequence of interactions with the at least first input control and the second input control, a second user interface that provides for display, in a single page of the second user interface and at the same time:
      (i) a review control, and
      (ii) the first input control and the second input control positioned on the single page in an order that is specified by the particular sequence of interactions and that is different than an order of the multiple first input controls provided for display in the first page and the multiple second input controls provided for display in the second page of the first user interface, wherein generating the second user interface includes locating the second input control before the first input control on the single page of the second user interface, and does not include a third input control from the multiple first input controls or the multiple second input controls, on the single page of the second user interfaces;
   receiving, by the computer system, data indicating selection of the review control that was displayed in the single page of the second user interface; and
   providing, by the computer system and based on receiving the data indicating selection of the review control, the first user interface for display, including a display of (i) the first page with the first input control and the third input control, or (ii) the second page with the second input control and the third input control.

2. The computer-implemented method of claim 1, wherein automatically generating the second user interface comprises generating a guided visual procedure for display to the user in order to guide an input of information by the user into the computer system.

3. The computer-implemented method of claim 1, wherein:
   at least one of the multiple first input controls or at least one of the multiple second input controls comprises an input field configured to permit user entry of information into the input field.

4. The computer-implemented method of claim 1, wherein analyzing the received first data and the received second data in order to identify the particular sequence of interactions comprises determining, by the computer system, that the particular sequence of interactions has been performed faster than other of the sequences with which multiple users interacted with the multiple first input controls and the multiple second input controls.

5. The computer-implemented method of claim 1, wherein analyzing the received first data and the received second data in order to identify a particular sequence of interactions comprises determining, by the computer system, that a number of users that interacted with the first input control and the second input control in the particular sequence exceeds a threshold number of users.

6. The computer-implemented method of claim 1, wherein storing, by the computer system, the information that specifies the particular sequence of interactions with at least the first input control and the second input control comprises storing, by the computer system, information that specifies a first amount of time for which the user interacted with the first input control and a second amount of time for which the user interacted with the second input control.

7. The computer-implemented method of claim 1, wherein storing, by the computer system, the information that specifies the particular sequence of interactions with at least the first input control and the second input control comprises storing, by the computer system, information that specifies an error that occurred as a result of the user interacting with the first input control or the second input control.

8. The computer-implemented method of claim 1, wherein the second page comprises a second navigation control that, when selected, causes navigation to the first page, the method comprising:
    receiving, by the computer system, an indication that the user selected the second navigation control to navigate to the first page, wherein receiving the first data that indicates that the user selected one or more of the multiple first input controls comprises receiving the first data that indicates the user selected one or more of the multiple first input controls after receiving the indication that the user selected the second navigation control to navigate to the first page.

9. A computer program product tangibly embodied in a non-transitory computer-readable storage medium and comprising instructions that when executed by a processor perform a method for personalizing applications, the method comprising:
    providing, by a computer system, a first page for display as part of a first user interface of a particular application program, wherein the first page includes:
        (i) multiple first input controls, including a first input control, with which users are able to interact in order to specify information for input to the computer system, and
        (ii) a first navigation control that, when selected, causes navigation to a second page of the particular application program;
    receiving, by the computer system, first data that indicates that a user selected one or more of the multiple first input controls wherein the first data indicates that the user selected the first input control;
    receiving, by the computer system, an indication that the user selected the first navigation control to navigate to the second page;
    providing, by the computing system and in response to having received the indication that the user selected the first navigation control, the second page for display as part of the first user interface, wherein the second page includes multiple second input controls, including a second input control, with which the user is able to interact in order to specific information for input to the computer system;
    receiving, by the computer system, second data that indicates that the user selected one or more of the multiple second input controls wherein the second data indicates that the user selected the second input control;
    analyzing, by the computer system, the received first data and the received second data in order to identify a particular sequence of interactions with at least the first input control and the second input control;
    storing, by the computer system, information that specifies the particular sequence of interactions with at least the first input control and the second input control;
    automatically generating, by the computer system and based on an analysis of the information that specifies the particular sequence of interactions with the at least first input control and the second input control, a second user interface that provides for display, in a single page of the second user interface and at the same time:
        (i) a review control, and
        (ii) the first input control and the second input control positioned on the single page in an order that is specified by the particular sequence of interactions and that is different than an order of the multiple first input controls provided for display in the first page and the multiple second input controls provided for display in the second page of the first user interface, wherein generating the second user interface includes locating the second input control before the first input control on the single page of the second user interface, and does not include a third input control from the multiple first input controls or the multiple second input controls, on the single page of the second user interfaces;
    receiving, by the computer system, data indicating selection of the review control that was displayed in the single page of the second user interface; and
    providing, by the computer system and based on receiving the data indicating selection of the review control, the first user interface for display, including a display of (i) the first page with the first input control and the third input control, or (ii) the second page with the second input control and the third input control.

10. The computer program product of claim 9, wherein automatically generating the second user interface comprises generating a guided visual procedure for display to the user in order to guide an input of information by the user into the computer system.

11. The computer program product of claim 9, wherein:
    at least one of the multiple first input, controls or at least one of the multiple second input controls comprises an input field configured to permit user entry of information into the input field.

12. The computer program product of claim 9, wherein analyzing the received first data and the received second data in order to identify the particular sequence of interactions comprises determining, by the computer system, that the particular sequence of interactions has been performed faster than other of the sequences with which multiple users interacted with the multiple first input controls and the multiple second input controls.

13. The computer program product of claim 9, wherein analyzing the received first data and the received second data in order to identify a particular sequence of interactions comprises determining, by the computer system, that a number of users that interacted with the first input control and the second input control in the particular sequence exceeds a threshold number of users.

14. A computer system comprising:
   a processor;
   a display device; and
   a computer readable storage device coupled to the processor having instructions stored thereon which, when executed by the processor, cause the processor to perform operations for personalizing applications, the operations comprising:
   providing, by a computer system, a first page for display as part of a first user interface of a particular application program, wherein the first page includes:
      (i) multiple first input controls, including a first input control, with which users are able to interact in order to specify information for input to the computer system, and
      (ii) a first navigation control that, when selected, causes navigation to a second page of the particular application program;
   receiving, by the computer system, first data that indicates that a user selected one or more of the multiple first input controls wherein the first data indicates that the user selected the first input control;
   receiving, by the computer system, an indication that the user selected the first navigation control to navigate to the second page;
   providing, by the computing system and in response to having received the indication that the user selected the first navigation control, the second page for display as part of the first user interface, wherein the second page includes multiple second input controls, including a second input control, with which the user is able to interact in order to specific information for input to the computer system;
   receiving, by the computer system, second data that indicates that the user selected one or more of the multiple second input controls wherein the second data indicates that the user selected the second input control;
   analyzing, by the computer system, the received first data and the received second data in order to identify a particular sequence of interactions with at least the first input control and the second input control;
   storing, by the computer system, information that specifies the particular sequence of interactions with at least the first input control and the second input control;
   automatically generating, by the computer system and based on an analysis of the information that specifies the particular sequence of interactions with the at least first input control and the second input control, a second user interface that provides for display, in a single page of the second user interface and at the same time:
      (i) a review control, and
      (ii) the first input control and the second input control positioned on the single page in an order that is specified by the particular sequence of interactions and that is different than an order of the multiple first input controls provided for display in the first page and the multiple second input controls provided for display in the second page of the first user interface, wherein generating the second user interface includes locating the second input control before the first input control on the single page of the second user interface, and does not include a third input control from the multiple first input controls or the multiple second input controls, on the single page of the second user interfaces;
   receiving, by the computer system, data indicating selection of the review control that was displayed in the single page of the second user interface; and
   providing, by the computer system and based on receiving the data indicating selection of the review control, the first user interface for display, including a display of (i) the first page with the first input control and the third input control, or (ii) the second page with the second input control and the third input control.

15. The computer system of claim 14, wherein the operation of automatically generating the second user interface comprises generating a guided visual procedure for display to the user in order to guide an input of information by the user into the computer system.

16. The computer system of claim 14, wherein:
   at least one of the multiple first input controls or at least one of the multiple second input controls comprises an input field configured to permit user entry of information into the input field.

17. The computer system of claim 14, wherein the operation of analyzing the received first data and the received second data in order to identify the particular sequence of interactions comprises determining, by the computer system, that the particular sequence of interactions has been performed faster than other of the sequences with which multiple users interacted with the multiple first input controls and the multiple second input controls.

18. The computer system of claim 14, wherein the operation of analyzing the received first data and the received second data in order to identify a particular sequence of interactions comprises determining, by the computer system, that a number of users that interacted with the first input control and the second input control in the particular sequence exceeds a threshold number of users.

* * * * *